US010228739B2

(12) United States Patent
Suzuki

(10) Patent No.: US 10,228,739 B2
(45) Date of Patent: Mar. 12, 2019

(54) POWER MANAGEMENT APPARATUS, POWER MANAGEMENT METHOD, POWER MANAGEMENT SYSTEM, AND NON-TRANSITORY STORAGE MEDIUM

(71) Applicant: NEC Corporation, Tokyo (JP)

(72) Inventor: Kazunori Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 15/515,386

(22) PCT Filed: Aug. 6, 2015

(86) PCT No.: PCT/JP2015/072367
§ 371 (c)(1),
(2) Date: Mar. 29, 2017

(87) PCT Pub. No.: WO2016/051958
PCT Pub. Date: Apr. 7, 2016

(65) Prior Publication Data
US 2017/0220086 A1 Aug. 3, 2017

(30) Foreign Application Priority Data
Sep. 30, 2014 (JP) .................................. 2014-200604

(51) Int. Cl.
H02J 3/28 (2006.01)
G06F 1/26 (2006.01)
(Continued)

(52) U.S. Cl.
CPC ................ G06F 1/263 (2013.01); G06F 1/28 (2013.01); G06F 1/3212 (2013.01); G06Q 50/06 (2013.01);
(Continued)

(58) Field of Classification Search
CPC ........ G06F 1/263; G06F 1/3212; H02J 3/386; H02J 3/383; H02J 9/06; H02J 7/007; H02J 13/00; H02J 7/0013; G06Q 50/06
(Continued)

(56) References Cited

U.S. PATENT DOCUMENTS

2010/0271199 A1* 10/2010 Belov ...................... G01M 5/00
340/539.3
2013/0073387 A1* 3/2013 Heath .................... G06Q 50/01
705/14.53
(Continued)

FOREIGN PATENT DOCUMENTS

JP 2003-284244 10/2003
JP 2008-278588 11/2008
(Continued)

OTHER PUBLICATIONS

Decision to Grant a Patent dated Feb. 7, 2017, by the Japanese Patent Office in counterpart Japanese Patent Application No. 2016-503257.
(Continued)

Primary Examiner — Ziaul Karim
(74) Attorney, Agent, or Firm — Finnegan, Henderson, Farabow, Garrett & Dunner, L.L.P.

(57) ABSTRACT

Provided is a technique for efficiently securing power when a predetermined natural phenomenon occurs. In order to solve such a problem, there is provided a power management apparatus (1) including an event information acquisition unit (10) that acquires event information indicating the occurrence of a predetermined event relating to a natural disaster and the detail of the event, a grouping unit (20) that divides a plurality of storage batteries as managing targets into a first group and a second group on the basis of the event information acquired by the event information acquisition
(Continued)

unit (10), and a storage battery control unit (30) that controls an charging operation of the storage battery for each group.

13 Claims, 11 Drawing Sheets

(51) Int. Cl.
*G06F 1/28* (2006.01)
*G06F 1/32* (2006.01)
*H02J 3/00* (2006.01)
*H02J 3/38* (2006.01)
*H02J 7/00* (2006.01)
*H02J 9/06* (2006.01)
*G06Q 50/06* (2012.01)
*H02J 13/00* (2006.01)
*G06F 1/3212* (2019.01)

(52) U.S. Cl.
CPC ............... *H02J 3/005* (2013.01); *H02J 3/28* (2013.01); *H02J 3/383* (2013.01); *H02J 3/386* (2013.01); *H02J 7/007* (2013.01); *H02J 7/0013* (2013.01); *H02J 9/06* (2013.01); *H02J 13/00* (2013.01); *H02J 2003/001* (2013.01); *Y02D 10/174* (2018.01); *Y02E 40/76* (2013.01); *Y04S 10/545* (2013.01)

(58) Field of Classification Search
USPC .................................................. 700/291–296
See application file for complete search history.

(56) References Cited

U.S. PATENT DOCUMENTS

2013/0193274 A1* 8/2013 Ookita .................. B61L 15/009
 246/1 C
2014/0148965 A1* 5/2014 Epstein ............... B60L 11/1842
 700/297

FOREIGN PATENT DOCUMENTS

| | | |
|---|---|---|
| JP | 2009-148070 | 7/2009 |
| JP | 2011-30383 | 2/2011 |
| JP | 2011-227877 | 11/2011 |
| JP | 2012-235541 | 11/2012 |
| JP | 2013-21781 | 1/2013 |
| JP | 2013-118722 | 6/2013 |
| JP | 2013-170430 | 9/2013 |
| JP | 2013-229992 | 11/2013 |

OTHER PUBLICATIONS

International Search Report and Written Opinion dated Oct. 20, 2015, in corresponding PCT International Application.

* cited by examiner

FIG. 4

| STORAGE BATTERY ID | POSSESSOR | INSTALLATION POSITION | ALTITUDE | SPECIFICATION | NUMBER OF YEARS IN USE | AMOUNT OF CHARGE | ADDRESS | GROUP |
|---|---|---|---|---|---|---|---|---|
| 000001 | ×××× | ···· | ○○○ | ···· | 3 | 70% | ···· | — |
| ···· | ···· | ···· | ···· | ···· | ···· | ···· | ···· | ···· |

FIG. 9

| DETAILS OF EVENT | DAMAGE PREDICTION AREA |
|---|---|
| ⋮ | ⋮ |

POWER MANAGEMENT APPARATUS, POWER MANAGEMENT METHOD, POWER MANAGEMENT SYSTEM, AND NON-TRANSITORY STORAGE MEDIUM

CROSS-REFERENCE TO RELATED PATENT APPLICATIONS

This application is a National Stage Entry of International Application No. PCT/JP2015/072367, filed Aug 6, 2015, which claims priority from Japanese Patent Application No. 2014-200604, filed Sep. 30, 2014. The entire contents of the above-referenced applications are expressly incorporated herein by reference.

TECHNICAL FIELD

The present invention relates to a power management apparatus, a power management method, a power management system, and a program.

BACKGROUND ART

A technique associated with the present invention is disclosed in Patent Documents 1 to 4.

Patent Document 1 discloses an anti-tsunami protection system that detects the occurrence of a tsunami, and switches the system of a plant to a protection system for suppressing tsunami damage of the plant. The anti-tsunami protection system includes a tsunami information receiving unit that receives tsunami information, a facility information database that stores facility information including, for each area, at least an altitude, a facility ID for identifying each facility, the presence or absence of a structure potentially becoming a flooded path between the plant and an outside structure or another facility, an underground structure ID given to the structure, and the flooded path, a protection apparatus information database that stores protection apparatus information for specifying a protection apparatus provided in the facility for each area, an inundation area determination unit that determines an inundation area of the plant with respect to a predicted height of the tsunami on the basis of the facility information and the protection apparatus information, and a protection apparatus control unit 4 that receives a determination result of the inundation area and transmits a control signal for performing startup and control of the protection apparatus.

Patent Document 2 discloses an apparatus for specifying a tsunami damage region that specifies a region which is likely to suffer damage, on the basis of tsunami information, in a case where a tsunami occurs and approaches to Japan. The apparatus for specifying a tsunami damage region includes a tsunami warning receiving unit that receives a tsunami warning including a plurality of predicted tsunami-threatened districts indicating coast districts in which an occurrence of a tsunami is expected and an expected height of the tsunami occurring in the predicted tsunami-threatened district, an altitude map information storage unit that stores altitude map information which is three-dimensional position information, a tsunami height extraction unit that specifies a corresponding region corresponding to the predicted tsunami-threatened district included in the tsunami warning, when the tsunami warning is received, in the altitude map information, in accordance with a predetermined rule, and acquires a predicted tsunami height in the predicted tsunami-threatened district to be a source for specifying the corresponding region from the tsunami warning, and a tsunami damage region determination unit that determines an expected tsunami damage region expected to suffer damage of the tsunami in the corresponding region, on the basis of the predicted tsunami height acquired by the tsunami height extraction unit and the altitude in the corresponding region.

Patent Document 3 discloses a disaster-coping distributed power supply system which is capable of linking a distributed power supply to a system power supply during a normal time, and capable of supplying appropriate power as an emergency power supply during a power failure of the system power supply. The disaster-coping distributed power supply system includes a distributed power supply and a power conditioner that links the distributed power supply to the system power supply. The system outputs single-phase alternating-current power while the distributed power supply and the system power supply are linked, and outputs three-phase alternating-current power by disconnecting the power conditioner from the system power supply during the power failure of the system power supply.

Patent Document 4 discloses a regional energy management method of securing a power supply of a disaster countermeasure hub and a disaster prevention hub after an occurrence of a disaster, and securing of power supplies of a fluctuating number of evacuation areas such as a community center, and immediately restoring a peripheral region by making the peripheral region collaborate with a large-scale facility such as a factory that operates distributed power supply introduction such as solar power generation or wind power generation, or an emergency power supply. In the regional energy management method, a network for interchanging power is constructed between a regional energy management function, which is a private sector facility including a storage battery function and is used as a restoration hub in a case where a disaster occurs, and a community center serving as a regional evacuation area. A delivery or recovery operation of the storage battery function is performed using the network so that when a disaster occurs, the regional energy management function optimally operates the power supply on the basis of a request for a power supply of the community center and a power supply capacity required in the private sector facility.

RELATED DOCUMENTS

Patent Documents

[Patent Document 1] Japanese Unexamined Patent Application Publication No. 2013-170430
[Patent Document 2] Japanese Unexamined Patent Application Publication No. 2011-227877
[Patent Document 3] Japanese Unexamined Patent Application Publication No. 2008-278588
[Patent Document 4] Japanese Unexamined Patent Application Publication No. 2013-118722

SUMMARY OF THE INVENTION

Technical Problem

Natural phenomena such as tsunamis, tidal waves, heavy rains, or typhoons may cause problems such as outage of a power plant or a private power generation apparatus and disabled use of a partial or entire power network due to submergence or the like. As a result, the supply of power to a consumer may be stopped.

In preparation for such a situation, it is necessary to efficiently secure power generated before the supply of power is stopped when a predetermined natural phenomenon that may cause natural disasters as stated above occurs. Patent Documents 1 to 4 do not disclose means for solving the problem.

An object of the present invention is to provide a technique for efficiently securing power when predetermined natural phenomena occur.

Solution to Problem

According to the present invention, there is provided a power management apparatus including: an event information acquisition unit that acquires event information indicating an occurrence of a predetermined event relating to a natural disaster and a detail of the event; a grouping unit that divides a plurality of storage batteries as managing targets into a first group and a second group, on the basis of the event information; and a storage battery control unit that controls a charging operation of each storage battery for each of the groups.

According to the present invention, there is provided a power management system including the power management apparatus and the plurality of storage batteries.

According to the present invention, there is provided a power management method executed by a computer, the method including: an event information acquisition step of acquiring event information indicating an occurrence of a predetermined event relating to a natural disaster and a detail of the event; a grouping step of dividing a plurality of storage batteries as managing targets into a first group and a second group, on the basis of the event information; and a storage battery control step of controlling a charging operation of each storage battery for each of the groups.

According to the present invention, there is provided a program for causing a computer to function as: an event information acquisition unit that acquires event information indicating an occurrence of a predetermined event relating to a natural disaster and a detail of the event; a grouping unit that divides a plurality of storage batteries as managing targets into a first group and a second group, on the basis of the event information; and a storage battery control unit that controls a charging operation of each storage battery for each of the groups.

According to the present invention, there is provided a power management apparatus including: an event information acquisition unit that acquires event information indicating an occurrence of a predetermined event relating to a natural disaster and a detail of the event; and a grouping unit that divides a plurality of storage batteries as managing targets into a first group and a second group, on the basis of the event information, in which the grouping unit includes a user interface unit that outputs effect information indicating an effect of the event on each of the plurality of storage batteries, the effect information created on the basis of the event information, and that receives a user's input for grouping the storage batteries into the first group and the second group, and a first grouping unit that divides the storage batteries into the first group and the second group on the basis of the user's input.

According to the present invention, there is provided a power management method executed by a computer, the method including: an event information acquisition step of acquiring event information indicating an occurrence of a predetermined event relating to a natural disaster and a detail of the event; and a grouping step of dividing a plurality of storage batteries as managing targets into a first group and a second group, on the basis of the event information, in which the grouping step executed by the computer includes a user interface step of outputting effect information indicating an effect of the event on each of the plurality of storage batteries, the effect information created on the basis of the event information, and receiving a user's input for grouping the storage batteries into the first group and the second group, and a first grouping step of dividing the storage batteries into the first group and the second group on the basis of the user's input.

In addition, according to the present invention, there is provided a program for causing a computer to function as: an event information acquisition unit that acquires event information indicating an occurrence of a predetermined event relating to a natural disaster and a detail of the event; and a grouping unit that divides a plurality of storage batteries as managing targets into a first group and a second group, on the basis of the event information, in which the grouping unit is caused to function as a user interface unit that outputs effect information indicating an effect of the event on each of the plurality of storage batteries, the effect information created on the basis of the event information, and that receives a user's input for grouping the storage batteries into the first group and the second group, and a first grouping unit that divides the storage batteries into the first group and the second group on the basis of the user's input.

Advantageous Effects of Invention

According to the present invention, it is possible to realize a technique for efficiently securing power when a predetermined natural phenomenon occurs.

BRIEF DESCRIPTION OF THE DRAWINGS

The above and other objects, features, and advantages will be made clearer from preferred exemplary embodiments described below, and the following accompanying drawings.

FIG. 4 is a diagram schematically illustrating an example of storage battery information of the present exemplary embodiment.

FIG. 9 is a diagram schematically illustrating an example of damage prediction information of the present exemplary embodiment.

DESCRIPTION OF EXEMPLARY EMBODIMENTS

First, an example of a hardware configuration of an apparatus of the present exemplary embodiment will be described. Each unit included in the apparatus of the present exemplary embodiment is embodied by any combination of hardware and software based on a central processing unit (CPU), a memory, a program (also including program downloaded from a recording medium such as a compact disc (CD), a server on the Internet, or the like, in addition to a program stored within a memory from a step of shipping an apparatus in advance) loaded into the memory, a storage unit such as a hard disc having the program stored thereon, and an interface for network connection of any computer. It will be understood by those skilled in the art that embodying methods and apparatuses thereof may be modified in various ways.

Figure 1:
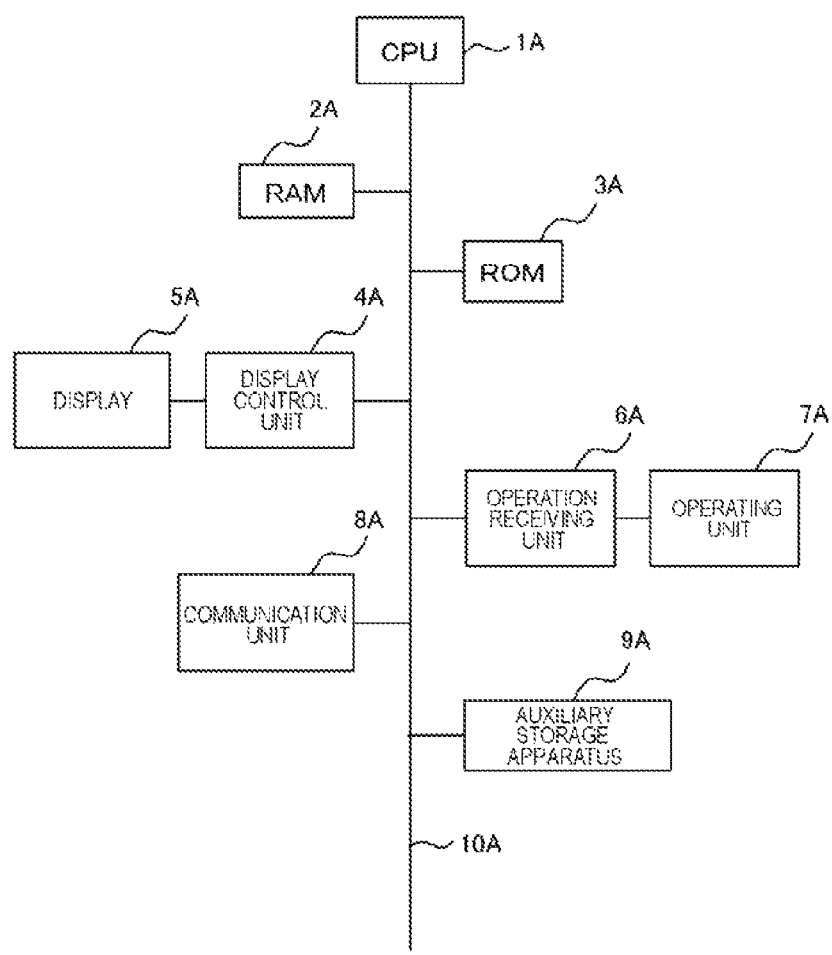
FIG. 1 is a diagram conceptually illustrating an example of a hardware configuration of an apparatus of the present exemplary embodiment.

FIG. 1 is a diagram conceptually illustrating an example of a hardware configuration of the apparatus of the present exemplary embodiment. As shown in the drawing, the apparatus of the present exemplary embodiment includes, for example, a CPU 1A, a random access memory (RAM) 2A, a read only memory (ROM) 3A, a display control unit 4A, a display 5A, an operation receiving unit 6A, an operating unit 7A, a communication unit 8A, an auxiliary storage apparatus 9A, and the like which are connected to each other through a bus 10A. Note that although not shown in the drawing, the apparatus may include other elements such as an input and output interface connected to an external device in a wired manner, a microphone, and a speaker, in addition thereto.

The CPU 1A controls the entire computer of the apparatus together with each element. The ROM 3A includes an area for storing programs for operating the computer, various application programs, various setting data used when these programs operate, and the like. The RAM 2A includes an area, such as a work area in order for programs to operate, in which data is temporarily stored. The auxiliary storage apparatus 9A is, for example, a hard disc drive (HDD), and can store high-volume data.

The display 5A is, for example, a display apparatus (such as a light emitting diode (LED) indicator, a liquid crystal display, or an organic electro luminescence (EL) display). The display 5A may be a touch panel display integrated with a touch pad. The display control unit 4A performs various screen displays by reading out data stored in a video RAM (VRAM), performing a predetermined process on the read-out data, and then sending the data to the display 5A. The operation receiving unit 6A receives various operations through the operating unit 7A. The operating unit 7A includes an operation key, an operation button, a switch, a jog dial, a touch panel display, a keyboard, and the like. The communication unit 8A is connected to a network such as the Internet or a local area network (LAN) in a wired and/or wireless manner, and communicates with other electronic apparatuses.

Hereinafter, the exemplary embodiments will be described. Note that each functional block diagram which is used in the description of the following exemplary embodiments represents a function-based block rather than a hardware-based configuration. In the drawings, each apparatus is described to be embodied by one apparatus, but its embodying means is not limited thereto. That is, each device may be configured to be physically or logically separated. Note that the same components are denoted by the same reference numerals and signs, and thus the description thereof will not be repeated.

<First Exemplary Embodiment>

First, the outline of the present exemplary embodiment will be described. A power management apparatus of the present exemplary embodiment performs operations based on the following premises.

Assisting to secure power in group units (for example, units of areas, self-governing bodies, or the like) including a plurality of individuals or public facilities, in addition to individual units when a predetermined natural phenomenon occurs.

Securing power by charging storage batteries which have recently been in widespread use, are held in individual units and public facility units, and are installed at various places of regions when a predetermined natural phenomenon occurs.

Hereinafter, the present invention will be described on the premise that power is secured in units of self-governing bodies, but power can also be secured in other units such as group units of a plurality of neighboring households or group units of neighboring acquaintances.

For example, the power management apparatus of the present exemplary embodiment having detected the occurrence of a predetermined natural phenomenon affecting a certain self-governing body is capable of being operated to control a plurality of storage batteries belonging to the self-governing body to be charged with power or the like from a power system (system which is managed by a power company, integrating power generation, power transformation, power transmission, and power distribution) or a private power generation apparatus belonging to the self-governing body. Thereby, the self-governing body can secure a certain amount of power. Thereafter, even in a case where a situation occurs in which the supply of power to the self-governing body is stopped, the self-governing body can cope with such a situation by using power which has been secured until the supply of power is stopped.

However, in a case where the charge of a plurality of storage batteries belonging to the self-governing body is not appropriately controlled, there is the possibility of not being able to obtain the necessary power after the occurrence of disaster.

Since a plurality of storage batteries are installed in various positions, some storage batteries may be unavailable due to submergence or the like under the effect of a natural phenomenon, and other storage batteries may be available without submergence or the like. In order to efficiently secure the necessary power, it is preferable to preferentially charge storage batteries which are expected to be available.

Consequently, in a case where the occurrence of a predetermined natural phenomenon is detected, the power management apparatus of the present exemplary embodiment divides a plurality of storage batteries as managing targets into a first group and a second group on the basis of the detail of the predetermined natural phenomenon. A storage battery which is expected to be available belongs to the first group. A storage battery which is expected to be unavailable belongs to the second group. Operations of the storage batteries of the first and second groups are controlled, and the storage battery of the first group is preferentially charged. With such a configuration, it is possible to efficiently secure necessary power after the detection of the occurrence of a predetermined natural phenomenon.

Figure 2:
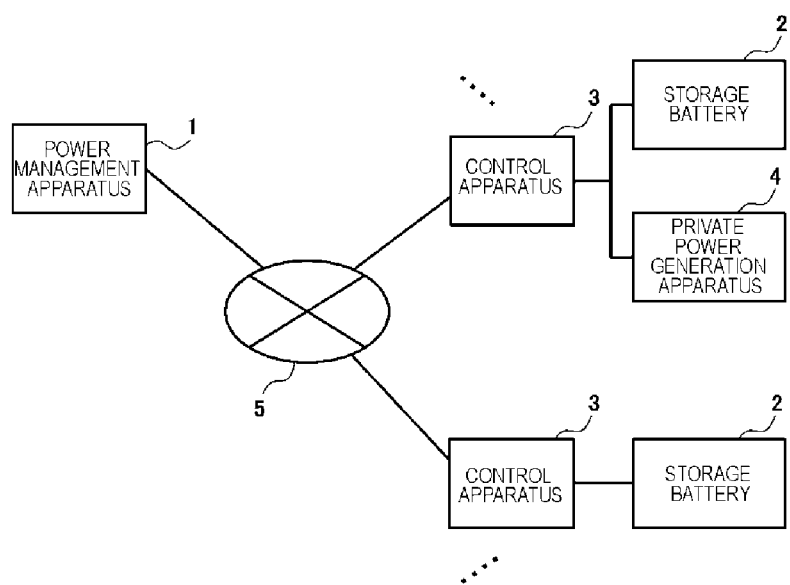
FIG. 2 is a diagram schematically illustrating an entire image of a power management system of the present exemplary embodiment.

Hereinafter, the details of the present exemplary embodiment will be described. FIG. 2 schematically illustrates an entire image of a power management system including a power management apparatus 1 of the present exemplary embodiment. The power management system includes the power management apparatus 1 and a plurality of storage batteries 2. Further, at least one of a control apparatus 3 and a private power generation apparatus 4 may be included therein.

The storage battery 2 is installed at a predetermined place. For example, the storage battery is installed at a house, an office, a store, a factory, a public facility, or the like of a consumer. The plurality of storage batteries 2 are communicably connected to the control apparatus 3 corresponding to each of the storage batteries through a network such as a LAN.

The private power generation apparatus 4 may be a power generation apparatus using natural energy such as sunlight, and may be a power generation apparatus using other energy. The private power generation apparatus 4 is installed at, for example, a house, an office, a store, a factory, a public facility, or the like of a consumer. The private power generation apparatus 4 is communicably connected to the control apparatus 3 corresponding to each apparatus through a network such as a LAN.

The control apparatus 3 is, for example, a so-called home energy management system (HEMS) controller. The control apparatus 3 is connected to the storage battery 2 and the private power generation apparatus 4 corresponding thereto, and controls their operations, or monitors their operating states by acquiring information from these components. In addition, the control apparatus 3 is connected to a network 5 such as the Internet, and is able to communicate with the power management apparatus 1 connected to the same network 5. For example, the control apparatus 3 controls the operations of the storage battery 2 and the private power generation apparatus 4, in accordance with a command received from the power management apparatus 1. In addition, the control apparatus 3 may transmit information (such as, for example, the amount of charge of the storage battery 2) acquired from the storage battery 2 and the private power generation apparatus 4 to the power management apparatus 1. Note that the storage battery 2 and the private power generation apparatus 4 may be connected to the network 5 to communicate with the power management apparatus 1.

Figure 3:
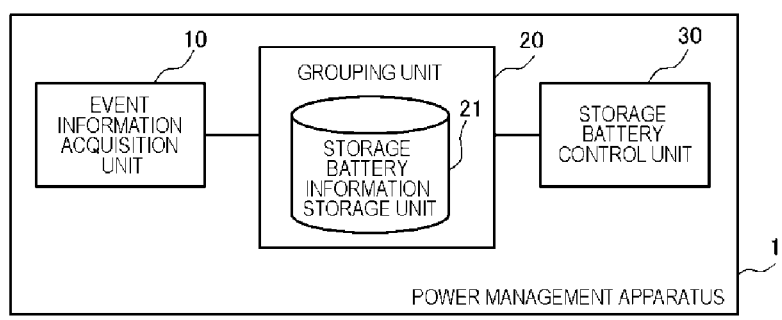
FIG. 3 is an example of a functional block diagram of power management apparatus 1 of the present exemplary embodiment.

FIG. 3 illustrates an example of a functional block diagram of the power management apparatus 1 of the present exemplary embodiment. As shown in the drawing, the power management apparatus 1 includes an event information acquisition unit 10, a grouping unit 20, and a storage battery control unit 30.

The event information acquisition unit 10 acquires event information indicating the occurrence of a predetermined event relating to a natural disaster and the detail of the event. The natural disaster herein refers to stopping the supply of power to a consumer due to a natural phenomenon. The predetermined event relating to such a natural disaster is, for example, a natural phenomenon (such as a tsunami, a tidal wave, a heavy rain, a volcanic eruption, or a landslide) of a predetermined level or higher, and may be, for example, a natural phenomenon of a warning or a special warning level announced by Japan Meteorological Agency. The detail of the event is the type of event (natural phenomenon), an area (for example, an area of warning or special warning) affected by the event, tsunami height, tidal wave height, the amount of rainfall, and the like.

The event information acquisition unit 10 may acquire, for example, event information which is input by a user through the operating unit 7A. For example, in a case where a predetermined event relating to a self-governing body to which the user belongs is announced by an organization or the like (for example, Meteorological Agency) that manages meteorological information, the user may input the event information to the power management apparatus 1 on the basis of the announced information. In addition, the event information acquisition unit 10 may receive the event information through the network 5 from the server of an organization that manages meteorological information. In addition, the event information acquisition unit 10 may have automatic (autonomous) access to the server or the like of an organization that manages meteorological information through the network 5, and acquire the event information.

The grouping unit 20 divides the plurality of storage batteries 2 as managing targets into the first group and the second group on the basis of the event information. The storage battery 2 of the first group is controlled by the storage battery control unit 30 described below to be charged preferentially over the storage battery 2 of the second group.

The plurality of storage batteries 2 as managing targets are storage batteries 2 which are registered beforehand as targets for controlling operations collectively in order to secure power when a predetermined event occurs. For example, information as shown in FIG. 4 is registered, and is stored in a storage battery information storage unit 21. Hereinafter, the information is referred to as "storage battery information". In FIG. 4, storage battery identification information (ID), a possessor, an installation position, an altitude, a specification, the number of years in use, the amount of charge, address information, and group information are associated with each other. Note that the storage battery information shown in the drawing is merely an example, and a portion of the information may not be included, or other information may be included.

The "storage battery identification information (ID)" is information for identifying each of the plurality of storage batteries 2 as managing targets. The "possessor" is a possessor of each of the storage batteries 2. The "installation position" is an installation position of each of the storage batteries 2, and is indicated by an address, latitude and longitude, or the like. The "altitude" is altitude of the installation position of each of the storage batteries 2. In a case where the installation position is raised with a foundation or the like provided thereunder, a value in which the height is considered may be registered.

The "specification" is the details of each of the storage batteries 2, and is, for example, capacity, charge speed or the like. The "number of years in use" is the accumulative number of years in use of each of the storage batteries 2. The "amount of charge" is latest information on the amount of charge of each of the storage batteries 2, and is indicated by the state of charge (SOC), the amount of power, or the like. For example, the power management apparatus 1 receives a report on the amount of power of the point in time of each of the storage batteries 2 periodically (for example, every one hour, every thirty minutes, every five minutes, or the like) from the control apparatus 3 corresponding to each of the storage batteries 2 or from each of the storage batteries 2. The column of the "amount of charge" is updated on the basis of the information.

The "address" is address information of each of the storage batteries 2, and/or address information (information for communication through the network 5) of the control apparatus 3 corresponding to each of the storage batteries 2.

The column of the "group" has information written therein which indicates groups (first and second groups) divided by the grouping unit 20 when a predetermined event occurs.

As a method of causing the grouping unit 20 to divide the plurality of storage batteries 2 as managing targets into the first and second groups, the following are considered. Note that the details of processes of (1) and (2) will be described in the following exemplary embodiments.

(1) The grouping unit 20 creates and outputs information for a user to determine whether each of the storage batteries 2 suffers damage of a predetermined level, on the basis of the event information or the storage battery information (installation position, altitude or the like) of each of the storage batteries 2. Thereafter, the grouping unit 20 receives an input for classifying each of the storage batteries 2 as the first or second group from a user, and classifies each of the storage batteries 2 in accordance therewith.

(2) The grouping unit 20 selects a storage battery 2 expected not to suffer damage of a predetermined level to classify the storage battery as the first group, on the basis of the event information or the storage battery information (installation position, altitude or the like) of each of the storage batteries 2, and selects a storage battery 2 expected to suffer damage of a predetermined level to classify the storage battery as the second group.

In a case where the event information acquisition unit 10 acquires the event information and the grouping unit 20 divides the storage batteries 2 as managing targets into the first and second groups, the storage battery control unit 30 controls the charging operation of the storage batteries 2 for each of the groups. For example, the storage battery control unit 30 performs control so that the storage battery 2 of the first group can be charged preferentially over the storage battery 2 of the second group. Note that operation control is not necessarily performed on all the apparatuses belonging to the groups, and some apparatuses which are out of a target may be present.

For example, the storage battery control unit 30 transmits a command for charging the storage battery 2 to the storage battery 2 of the first group or the control apparatus 3 corresponding to the storage battery 2. Then, the storage battery 2 which is not being charged at that point in time starts to be charged in accordance with the command. In addition, the storage battery 2 which is being charged at that point in time continues to be charged. The storage battery 2 of the first group continues to be charged, for example, until the storage battery reaches a full charge state, or until the supply of power to the storage battery 2 is stopped and therefore the storage battery cannot be charged.

The storage battery 2 is charged with power from a power system or a corresponding private power generation apparatus 4. The corresponding private power generation apparatus 4 is a private power generation apparatus 4 which is managed by the same consumer as that of a storage battery 2 which is a target for charge, and is able to supply power through the storage battery 2 and a predetermined power wiring (without going through a power system).

In addition, the storage battery control unit 30 transmits a command for stopping a charging operation to the storage battery 2 of the second group or the control apparatus 3 corresponding to the storage battery 2. Then, the storage battery 2 performing a charging operation at the point in time stops the charging operation in accordance with the command. In addition, the storage battery 2 which is not performing a charging operation at the point in time continues the state. Note that while the storage battery 2 of the second group is not charged, power generated by the private power generation apparatus 4 corresponding to the storage battery 2 may be fed to a power system. The power fed to the power system in this manner is used to charge the storage battery 2 of the first group. In addition, during this time, the private power generation apparatus 4 corresponding to the storage battery 2 may stop the generation of power.

In this manner, power generated by the private power generation apparatus 4 corresponding to the storage battery 2 of the second group is fed to the power system (reverse power flow), and thus the power can be used to charge the storage battery 2 of the first group. In addition, similarly, power with which the storage battery 2 of the second group is charged is fed to the power system (reverse power flow), and thus the power may be used to charge the storage battery 2 of the first group. In addition, the private power generation apparatus 4 corresponding to the storage battery 2 of the second group may stop the generation of power.

Note that in a case where the charging of the storage battery 2 of the first group reaches a predetermined state, the storage battery control unit 30 may start charging the storage battery 2 of the second group in accordance therewith. The predetermined state may be, for example, a state where charging of a predetermined level (for example, SOC 90% or higher or SOC 100%) is completed in the storage battery 2 of a predetermined ratio (for example, 70% or higher, 90% or higher, or 100%) of the first group. For example, the storage battery 2, in which charging of a predetermined level is completed after a charging command from the storage battery control unit 30 is received, or the control apparatus 3 corresponding thereto may be configured to notify the power management apparatus 1 of the effect. In a case where the storage battery control unit 30 monitors the latest charge state of the storage battery 2 of the first group and detects that the state reaches a predetermined state, the control unit may transmit a command for performing a charging operation, to the storage battery 2 of the second group or the control apparatus 3 corresponding to the storage battery 2.

The storage battery 2 of the second group is charged with power from a power system or a corresponding private power generation apparatus 4. The storage battery 2 of the second group continues to be charged, for example, until the storage battery reaches a full charge state, or until the supply of power to the storage battery 2 is stopped and therefore the storage battery cannot be charged.

Note that the storage battery 2 of the second group may not also be charged instead of a process of charging the storage battery 2 of the second group after the storage battery 2 of the first group is charged. In this case, the storage battery control unit 30 may perform control to discharge power with which the storage battery 2 of the second group is charged (for example, feed power to the power system) in order to reduce a remaining amount. Since charging the storage battery 2 which is likely to be unavailable is possibly dangerous, in terms of safety, the storage battery 2 of the second group having a remaining amount may be discharged to suppress the occurrence of a fire due to a short circuit or the like.

As described above, while the storage battery control unit 30 controls the operations of the storage batteries 2 of the first and second groups, each of the storage batteries 2 and/or the control apparatus 3 may output to the effect that the power management apparatus 1 is controlling the operation of the storage battery 2 through remote control, due to a time of emergency. Examples of output means to be considered include indication on a display, output of a voice through a speaker, lighting of a predetermined warning lamp, and the like, but other means can also be adopted. Such a notification allows the possessor of the storage battery 2 to recognize a situation. Besides, each of the storage batteries 2 and/or the control apparatus 3 may give notice of damage prediction information, the level of evacuation (evacuation advisory, evacuation instruction or the like), an evacuation area, evacuation route information, and the like.

Figure 5:
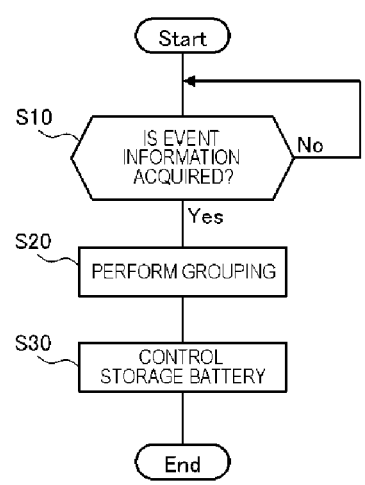
FIG. 5 is a flow diagram illustrating an example of a flow of processes performed by the power management apparatus 1 of the present exemplary embodiment.

Next, an example of a flow of processes of power management apparatus 1 of the present exemplary embodiment will be described with reference to a flow diagram of FIG. 5.

The event information acquisition unit 10 is set to be in a waiting state for event information acquisition (S10). In a case where the event information acquisition unit 10 acquires the event information (Yes of S10), the grouping unit 20 divides a plurality of storage batteries 2 as managing targets into the first and the second groups on the basis of the event information (S20).

Thereafter, the storage battery control unit 30 controls the operations of the plurality of storage batteries 2 as managing targets so as to preferentially charge the storage battery 2 of the first group, on the basis of the result of grouping in S20 (S30).

It should be noted that the storage battery 2 and/or the control apparatus 3 controlled by the storage battery control unit 30 so as to perform charging may notify the power management apparatus 1 of the amount of charge, after the termination of charging. The power management apparatus 1 may output information relating to the charge state to a user, on the basis of such a notification from each of the storage batteries 2 and/or each of the control apparatuses 3. For example, the power management apparatus 1 may output a list of storage batteries 2 having remaining power, the amount of charge of each of the storage batteries 2, the total amount of the amounts of charge, and the like to a user. The user can use such information in the future in planning power management while in evacuation.

In a case where a predetermined event relating to a natural disaster (stop of power supply to a consumer) occurs, the power management apparatus 1 of the present exemplary embodiment described above can classify a plurality of storage batteries 2 as managing targets into the preferentially charged first group and the second group which is another group, on the basis of the detail of the predetermined event. It is possible to preferentially charge the storage battery 2 of the first group.

For example, the storage battery 2 expected to be unavailable due to the effect of a natural phenomenon having occurred is classified as the second group, and the storage battery 2 expected to be available is classified as the first group, thereby allowing charging to be controlled.

According to such a power management apparatus 1, when a predetermined natural phenomenon occurs, it is possible to efficiently secure necessary power.

<Second Exemplary Embodiment>

In the present exemplary embodiment, a grouping unit 20 creates and outputs information for a user to determine whether each of the storage batteries 2 suffers damage (damage causing unavailable batteries) of a predetermined level, on the basis of the event information or the storage battery information (installation position, altitude or the like) of each of the storage batteries 2. The grouping unit 20 receives an input for classifying each of the storage batteries 2 as the first or the second group from a user, and classifies each of the storage batteries 2 in accordance therewith.

Figure 6:
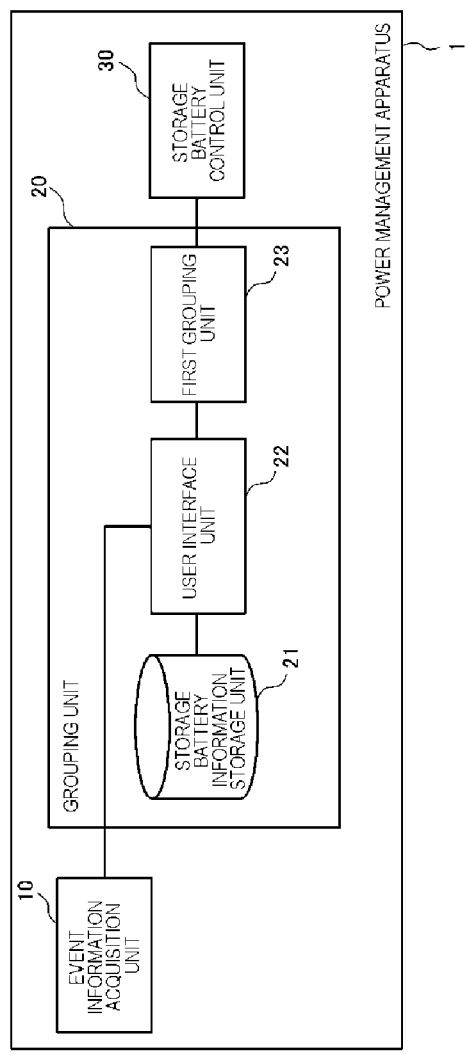
FIG. 6 is an example of a functional block diagram of a power management apparatus 1 of the present exemplary embodiment.

FIG. 6 illustrates an example of a functional block diagram of a power management apparatus 1 of the present exemplary embodiment. As shown in the drawing, the power management apparatus 1 includes an event information acquisition unit 10, a grouping unit 20, and a storage battery control unit 30. The configurations of the event information acquisition unit 10 and the storage battery control unit 30 are the same as those in the first exemplary embodiment.

The grouping unit 20 includes a storage battery information storage unit 21, a user interface unit 22, and a first grouping unit 23.

As is the case with the first exemplary embodiment, the storage battery information storage unit 21 stores information (storage battery information) relating to each of a plurality of storage batteries 2 as managing targets. FIG. 4 illustrates an example of the storage battery information.

The user interface unit 22 outputs effect information created on the basis of the event information to a user. The effect information is information indicating the effect of an event (event indicated by the event information acquired by the event information acquisition unit 10) on each of the plurality of storage batteries 2. Specifically, the effect information may be, for example, information indicating both map information showing the installation position of the storage battery 2 and a damage area which is predicted to suffer damage of a predetermined level on the basis of the event information. After the effect information is output, the user interface unit 22 receives a user's input for grouping the plurality of storage batteries 2 into the first group and the second group.

Examples of output means of the effect information performed by the user interface unit 22 to be considered include an indication on the display 5A included in the power management apparatus 1, uploading to a predetermined server, an output through a printer connected to the power management apparatus 1, mail transmission to an e-mail address registered in advance, and the like.

A user can browse, for example, effect information displayed on the display 5A, effect information printed out from a printer, or effect information transmitted by mail. Besides, a user can has access to effect information saved in the predetermined server using a predetermined terminal (such as, for example, a portable terminal), and displays the effect information on the display of the terminal to browse the information.

Here, an example of operations performed by the user interface unit 22 will be described.

Figure 7:
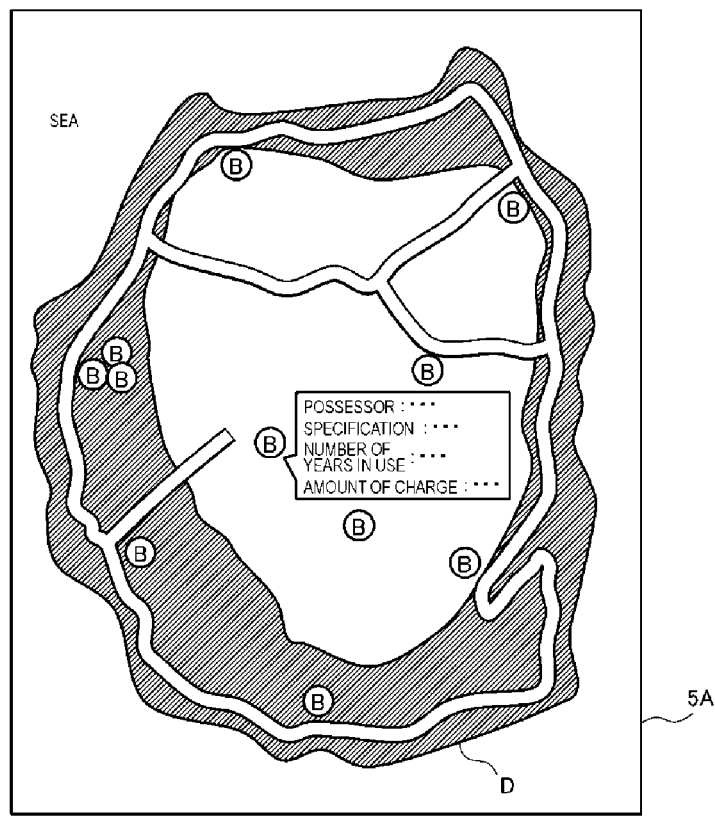
FIG. 7 is a diagram schematically illustrating an example of effect information of the present exemplary embodiment.

FIG. 7 illustrates an example of the effect information which is output by the user interface unit 22. FIG. 7 illustrates a map of an area installed with the storage battery 2 as a managing target. In addition, the installation position (position shown by a circle B in the drawing) of each of the storage batteries 2 is shown on the basis of the storage battery information. Further, a damage prediction area (shaded area shown by D in the drawing) is shown which is predicted to suffer damage of a predetermined level on the basis of the event information.

Figure 9:
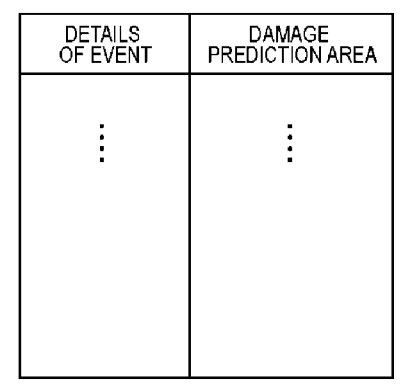

Note that, in the present exemplary embodiment, every means can be adopted as means for specifying the damage prediction area D. For example, the grouping unit 20 may previously store damage prediction information, for each of details of an event (for example, tsunami having a height of xx or over, heavy rain having a rainfall of AA or over), in which a damage prediction area predicted to suffer damage of a predetermined level when the event occurs is specified in advance (see FIG. 9). The grouping unit 20 may specify the damage prediction area D on the basis of the event information and the damage prediction information.

In a case of the example shown in FIG. 7, the user interface unit 22 includes a unit that displays a map of an area, installed with the storage battery 2 as a managing target, on a display, a unit that superimposes and displays information indicating the installation position of each of the storage batteries 2 on the map, and a unit that superimposes and displays information indicating the damage prediction area D on the map.

The user interface unit 22 may receive, on a user interface screen shown in FIG. 7, a user's input for individually designating each of a plurality of storage batteries 2 (for example, touch operation, input operation by moving a cursor position to the storage battery 2 shown by the circle B, or the like), and for designating which of the first and second groups the storage battery belongs to. For example, a user may perform an input so that a storage battery 2 which is not installed in the damage prediction area D may belong to the first group, and that a storage battery 2 which is installed in the damage prediction area D may belong to the second group.

In addition, in a case where a user's input for designating one storage battery 2 on the user interface screen through a predetermined operation is received, the user interface unit 22 may display the details of the storage battery 2 on the basis of the storage battery information. In a case of the example of FIG. 7, a storage battery 2 near the center is designated, and the possessor, the specification, the number of years in use, the amount of charge, and the like of the storage battery 2 are displayed in the format of a balloon.

A user may group the storage batteries 2 while referring to such details of the storage batteries 2. For example, a storage battery 2 having a short accumulative number of years in use and a low possibility of a failure may belong to the first group, and a storage battery 2 having a long accumulative number of years in use and a high possibility of a failure may belong to the second group. In addition, even in a case of a storage battery 2 which is not installed in the damage prediction area D, a storage battery 2 having a long accumulative number of years in use and a high possibility of a failure or a storage battery which has already full charged at that point in time may belong to the second group. In addition, a storage battery 2 having a relatively rapid charge speed may belong to the first group.

Figure 8:
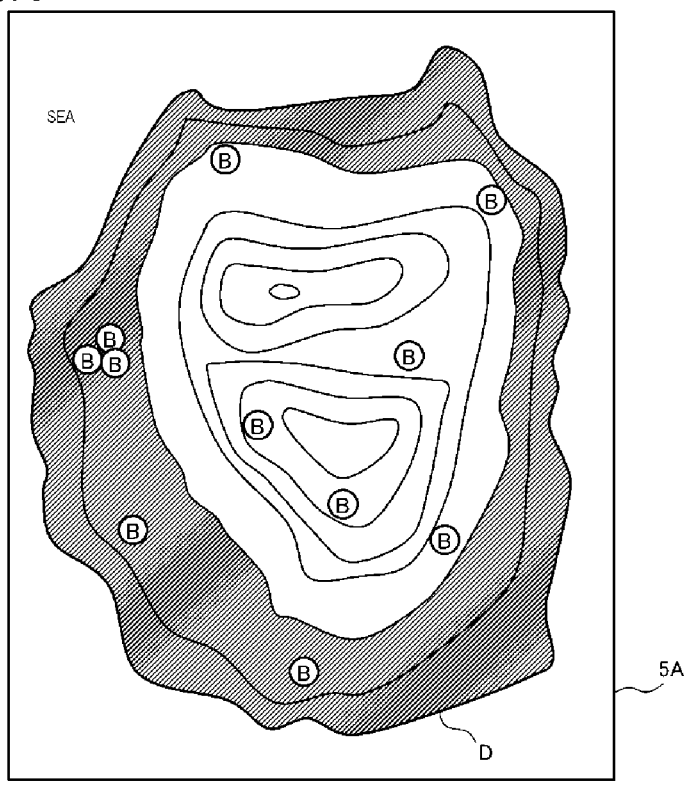
FIG. 8 is a diagram schematically illustrating an example of the effect information of the present exemplary embodiment.

In addition, in a case where an input for changing the form of a map on the user interface screen is received, the user interface unit 22 may change the form of the map. For example, as shown in FIG. 8, the map may be displayed by a contour plot.

A user can perform the grouping of the storage batteries 2 in comprehensive consideration of a variety of information.

Here, another example of operations performed by the user interface unit 22 will be described.

For example, the user interface unit 22 may output a list (character information) of the storage battery information of the storage battery 2 as a managing target, as shown in FIG. 4, as a portion of the effect information. In addition, the user interface unit 22 may output information (character information) indicating the damage prediction area D, as a portion of the effect information. In a case of the example, the damage prediction area D may be indicated by character information like No. "○" to No. "△" ○○ street or the like. A user may perform the grouping of the storage batteries 2 on the basis of such effect information, and perform an input for designating which of the first and second groups each of the plurality of storage batteries 2 belongs to.

According to the power management apparatus 1 of the present exemplary embodiment described above, it is possible to realize the same operation and effect as that in the first exemplary embodiment. In addition, according to the power management apparatus 1 of the present exemplary embodiment, a user can group the plurality of storage batteries 2 as managing targets into the first and second groups, with reference to the effect information created on the basis of the event information, the storage battery information or the like. According to such a present exemplary embodiment, a user determines whether each of a plurality of storage batteries 2 suffers damage (damage causing unavailable batteries) of a predetermined level with a high degree of accuracy, and thus can classify the storage batteries into the first and second groups. As a result, when a predetermined natural phenomenon occurs, necessary power can be efficiently secured.

<Third Exemplary Embodiment>

In the present exemplary embodiment, the grouping unit 20 selects a storage battery 2 expected not to suffer damage of a predetermined level to classify the storage battery as the first group, on the basis of the event information or the storage battery information (installation position, altitude or the like) of each of the storage batteries 2, and selects a storage battery 2 expected to suffer damage of a predetermined level to classify the storage battery as the second group.

Figure 10:
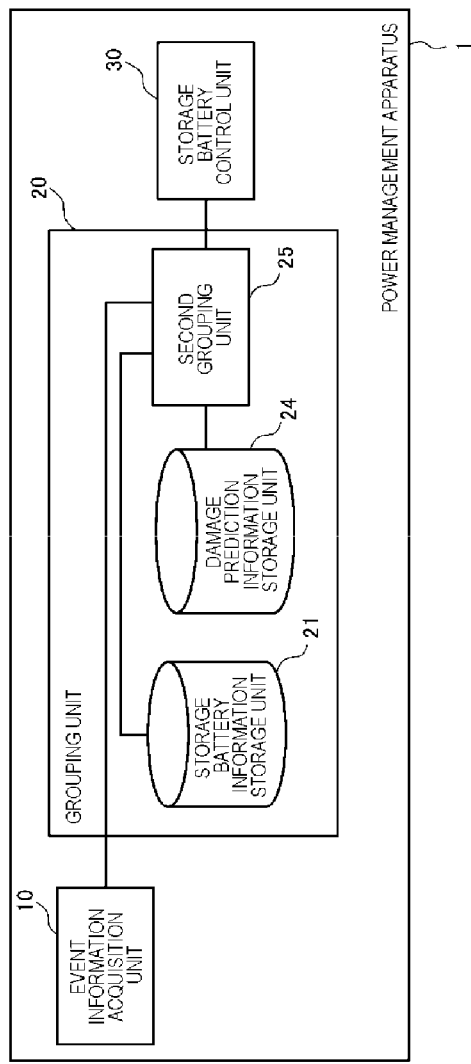
FIG. 10 is an example of a functional block diagram of a power management apparatus 1 of the present exemplary embodiment.

FIG. 10 illustrates an example of a functional block diagram of a power management apparatus 1 of the present exemplary embodiment. As shown in the drawing, the power management apparatus 1 includes an event information acquisition unit 10, a grouping unit 20, and a storage battery control unit 30. The configurations of the event information acquisition unit 10 and the storage battery control unit 30 are the same as those in the first exemplary embodiment.

The grouping unit 20 includes a storage battery information storage unit 21, a damage prediction information storage unit 24, and a second grouping unit 25. The configuration of the storage battery information storage unit 21 is the same as that in the second exemplary embodiment.

The damage prediction information storage unit 24 stores the damage prediction information (see FIG. 9) in which a damage prediction area predicted to suffer damage (for example, submergence or the like) of a predetermined level is specified in advance for each of the details of an event (for example, tsunami having a height of "xx" or over, heavy rain having a rainfall of "△△" or over). The damage prediction area is indicated by an address, latitude and longitude, or the like.

The second grouping unit 25 may specify a damage prediction area due to an event having occurred this time, on the basis of the event information acquired by the event information acquisition unit 10 and the damage prediction information (see FIG. 9) stored by the damage prediction information storage unit 24 in advance. The second grouping unit 25 determines whether the installation position of each of the storage batteries 2 is located within the specified damage prediction area, on the basis of the storage battery information (see FIG. 4) stored by the storage battery information storage unit 21. The second grouping unit 25 classifies a storage battery 2 which is not located in the specified damage prediction area as the first group, and classified a storage battery 2 which is located in the damage prediction area as the second group.

Note that, the second grouping unit 25 may classify a storage battery 2 as the second group even in a case of the storage battery being classified as the first group on the basis of the specified damage prediction area, when the storage battery is determined to satisfy a predetermined condition on the basis of the storage battery information including at least one of the amount of charge, the accumulative number of years in use, and the capacity of each of the storage batteries 2. For example, a storage battery 2 satisfying the conditions that the charge state is full charge, the accumulative number of years in use is equal to or greater than a predetermined value, and the capacity is equal to or less than a predetermined value, and the like may be classified as the second group.

In addition, the second grouping unit 25 may classify a storage battery 2 as the first group even in a case of the storage battery being classified as the second group on the basis of the specified damage prediction area, when the storage battery is determined to satisfy a predetermined condition on the basis of the storage battery information including at least one of the accumulative number of years in use and the capacity of each of the storage batteries 2. For example, a storage battery 2 satisfying the conditions that the accumulative number of years in use is equal to or less than a predetermined value, the capacity is equal to or greater than a predetermined value, and the like may be classified as the first group.

As another example, the second grouping unit 25 may perform grouping on the basis of the event information acquired by the event information acquisition unit 10 and the storage battery information (see FIG. 4) stored by the storage battery information storage unit 21. That is, the second grouping unit 25 may perform grouping without using the damage prediction information (see FIG. 9) stored by the damage prediction information storage unit 24. For example, the second grouping unit 25 determines conditions for division into the first and second groups on the basis of the event information, and thus can perform grouping in accordance with the conditions. As a specific example, in a case where the event information of "tsunami having a height of 5 m" is acquired, the second grouping unit 25 may create "conditions that a storage battery 2 disposed at an altitude of equal to or less 5 m is set to the second group, and a storage battery 2 disposed at a position having an altitude of higher than 5 m is set to the first group".

Note that a configuration may be used in which, even after automatic grouping is performed by the power management apparatus 1, the grouping results can be corrected in accordance with a user's operation. For example, after automatic grouping is performed by the power management apparatus 1 and before the control of a storage battery 2 by the storage battery control unit 30 is started, the power management apparatus 1 may output the result of grouping to a user. After the output, the power management apparatus 1 may receive an input for correcting the result, or an input for starting the control of the storage battery 2 based on the determined result (result obtained by automatic grouping by the power management apparatus 1, or result of a correction by a user). After the input for starting the control of the storage battery 2 based on the determined result is received, the storage battery control unit 30 may start the control of the storage battery 2 on the basis of the determined results.

For example, the power management apparatus 1 may output the same screen as the screen shown in FIG. 7 or 8, as the result of grouping. On the screen, it may be identified and displayed which of the first and second groups each of the storage batteries 2 (shown by the circle B in the drawing) belongs to, with the color, size, or shape of a mark (circle B), character information given to the mark, and the like. On the screen, thereafter, a user's input for changing the group of each of the storage batteries 2 may be received. In addition, the power management apparatus 1 may output the list information of the plurality of storage batteries 2 as shown in FIG. 4. Thereafter, a user's input for individually changing the information may be received.

According to the present exemplary embodiment described above, it is possible to realize the same operation and effect as those in the first and second exemplary embodiments. In addition, according to the present exemplary embodiment, a user's work such as a determination on which of the first and second groups each of the plurality of storage batteries 2 is divided into, an input of the determination result, and the like is not required. When a predetermined event occurs, there may be a concern that the operation of the power management apparatus 1 cannot be performed due to the user's time being taken up with evacuation, assistance of evacuation, or the like. According to the present exemplary embodiment, since the power management apparatus 1 automatically groups the plurality of storage batteries 2, and preferentially charges the storage battery 2 of the first group, it is possible to efficiently secure power even in such a case.

<Fourth Exemplary Embodiment>

Figure 11:
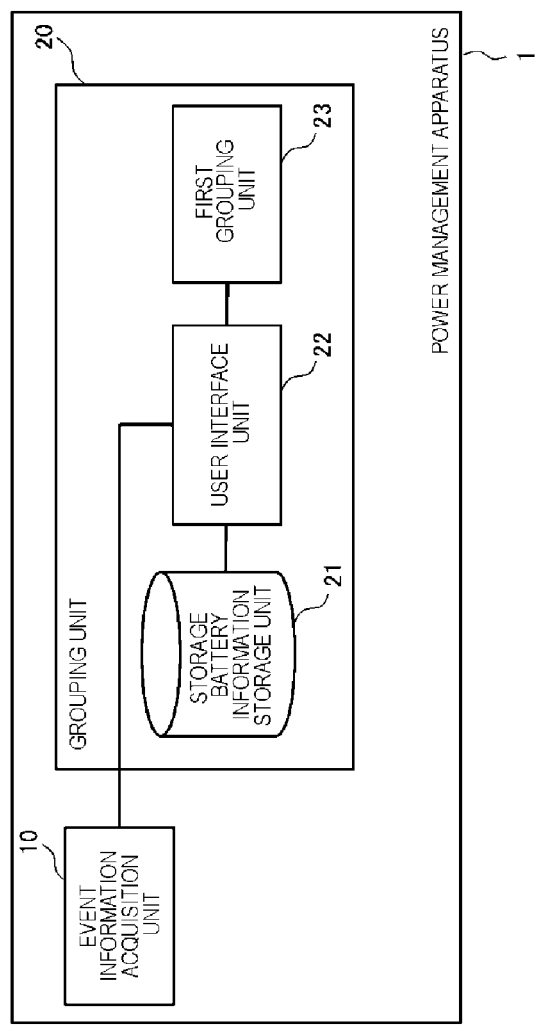
FIG. 11 is an example of a functional block diagram of a power management apparatus 1 of the present exemplary embodiment.

FIG. 11 illustrates an example of a functional block diagram of a power management apparatus 1 of the present exemplary embodiment. The power management apparatus 1 of the present exemplary embodiment is different from the power management apparatus 1 of the second exemplary embodiment, in that the storage battery control unit 30 is not included therein. Other configurations of the power management apparatus 1 of the present exemplary embodiment are the same as those in the second exemplary embodiment.

According to the power management apparatus 1 of the present exemplary embodiment, it is possible to create effect information indicating the effect of an event (event indicated by the event information acquired by the event information acquisition unit 10) on each of a plurality of storage batteries 2, on the basis of the event information or the storage battery information, and to output the effect information to a user. Thereafter, it is possible to receive an input for grouping the plurality of storage batteries 2 from a user, and to group the plurality of storage batteries 2 on the basis of the user's input. A user can group the plurality of storage batteries 2 as managing targets into the first and second groups, with reference to the effect information.

Thereafter, a user can individually perform remote control or the like on the plurality of storage batteries 2, and charge the storage battery 2 of the first group preferentially over the storage battery 2 of the second group.

According to such a present exemplary embodiment, a user can classify the plurality of storage batteries 2 as managing targets into the first group which is preferentially charged and another second group while referring to the effect information including beneficial information created on the basis of the event information or the storage battery information when a predetermined event occurs. Therefore, it is possible to increase the accuracy of the grouping.

Hereinafter, examples of reference forms are appended.

1. A power management apparatus including:
an event information acquisition unit that acquires event information indicating an occurrence of a predetermined event relating to a natural disaster and a detail of the event;
a grouping unit that divides a plurality of storage batteries as managing targets into a first group and a second group, on the basis of the event information; and
a storage battery control unit that controls a charging operation of each storage battery for each of the groups.

2. The power management apparatus according to 1, wherein the grouping unit includes:

a user interface unit that outputs effect information indicating an effect of the event on each of the plurality of storage batteries, the effect information created on the basis of the event information, and that receives a user's input for grouping the storage batteries into the first group and the second group, and a first grouping unit that divides the storage batteries into the first group and the second group on the basis of the user's input.

3. The power management apparatus according to 2, wherein the user interface unit outputs an installation position of each of the storage batteries and a damage prediction area which is predicted to suffer damage of a predetermined level on the basis of the event information, as the effect information.

4. The power management apparatus according to 3, wherein the user interface unit includes:

a unit that displays a map of an area installed with a storage battery, on a display, a unit that superimposes and displays information indicating the installation position of each storage battery, on the map, and a unit that superimposes and displays information indicating the damage prediction area, on the map.

5. The power management apparatus according to any one of 2 to 4, wherein the user interface unit includes a unit that outputs at least one of an amount of charge, an accumulative number of years in use, and a capacity of each of the storage batteries.

6. The power management apparatus according to 1, wherein the grouping unit includes a second grouping unit that specifies a damage prediction area on the basis of the event information acquired by the event information acquisition unit and damage prediction information in which the damage prediction area is specified in advance for each of details of the event, and classifies the storage battery located in the damage prediction area as the second group on the basis of storage battery information indicating an installation position of each of the storage batteries.

7. The power management apparatus according to 6, wherein the second grouping unit classifies a storage battery as the second group even in a case of the storage battery being classified as the first group on the basis of the damage prediction area, when the storage battery is determined to satisfy a predetermined condition on the basis of the storage battery information including at least one of the amount of charge, the accumulative number of years in use and, the capacity of each of the storage batteries.

8. The power management apparatus according to 6 or 7, wherein the second grouping unit classifies a storage battery as the first group even in a case of the storage battery being classified as the second group on the basis of the damage prediction area, when the storage battery is determined to satisfy a predetermined condition on the basis of the storage battery information including at least one of the accumulative number of years in use and the capacity of each of the storage batteries.

9. The power management apparatus according to 1, wherein the grouping unit includes a second grouping unit that divides the plurality of storage batteries into the first group and the second group, on the basis of the event information acquired by the event information acquisition unit and storage battery information relating to each of the storage batteries.

10. The power management apparatus according to any one of 1 to 9, wherein the storage battery control unit performs control so as to discharge power of the storage battery of the second group.

11. The power management apparatus according to 10, wherein the storage battery control unit performs control so as to feed the power of the storage battery of the second group to a power system.

12. The power management apparatus according to any one of 1 to 11, wherein the storage battery control unit further controls a private power generation apparatus configured to supply power to the storage battery of the second group, and feeds power generated by the private power generation apparatus to the power system.

13. A power management system including:

the power management apparatus according to any one of 1 to 12; and a plurality of storage batteries.

14. A power management method executed by a computer, the method inducing:

an event information acquisition step of acquiring event information indicating an occurrence of a predetermined event relating to a natural disaster and a detail of the event;

a grouping step of dividing a plurality of storage batteries as managing targets into a first group and a second group, on the basis of the event information; and a storage battery control step of controlling a charging operation of each storage battery for each of the groups.

14-2. The power management method according to 14, wherein the grouping step executed by the computer includes a user interface step of outputting effect information indicating an effect of the event on each of the plurality of storage batteries, the effect information created on the basis of the event information, and receiving a user's input for grouping the storage batteries into the first group and the second group, and a first grouping step of dividing the storage batteries into the first group and the second group on the basis of the user's input.

14-3. The power management method according to 14-2, wherein the user interface step includes outputting an installation position of each of the storage batteries and a damage prediction area which is predicted to suffer damage of a predetermined level on the basis of the event information, as the effect information.

14-4. The power management method according to 14-3, wherein the user interface step executed by the computer includes a step of displaying a map of an area installed with a storage battery, on a display, a step of superimposing and displaying information indicating the installation position of each storage battery, on the map, and a step of superimposing and displaying information indicating the damage prediction area, on the map.

14-5. The power management method according to any one of 14-2 to 14-4, wherein the user interface step executed by the computer includes a step of outputting at least one of an amount of charge, an accumulative number of years in use, and a capacity of each of the storage batteries.

14-6. The power management method according to 14, wherein the grouping step executed by the computer includes a second grouping step of specifying a damage prediction area on the basis of the event information acquired in the event information acquisition step and damage prediction information in which the damage prediction area is specified in advance for each of details of the event, and classifying the storage battery located in the damage prediction area as the second group on the basis of storage battery information indicating an installation position of each of the storage batteries.

14-7. The power management method according to 14-6, wherein the second grouping step includes classifying a storage battery as the second group even in a case of the storage battery being classified as the first group on the basis of the damage prediction area, when the storage battery is determined to satisfy a predetermined condition on the basis of the storage battery information including at least one of the amount of charge, the accumulative number of years in use and, the capacity of each of the storage batteries.

14-8. The power management method according to 14-6 or 14-7, wherein the second grouping step includes classifying a storage battery as the first group even in a case of the storage battery being classified as the second group on the basis of the damage prediction area, when the storage battery is determined to a satisfy predetermined condition on the basis of the storage battery information including at least one of the accumulative number of years in use and the capacity of each of the storage batteries.

14-9. The power management method according to 14, wherein the grouping step executed by the computer includes a second grouping step of dividing the plurality of storage batteries into the first group and the second group, on the basis of the event information acquired in the event information acquisition step and storage battery information relating to each of the storage batteries.

14-10. The power management method according to any one of 14 to 14-9, wherein the storage battery control step includes performing control so as to discharge power of the storage battery of the second group.

14-11. The power management method according to 14-10, wherein the storage battery control step includes performing control so as to feed the power of the storage battery of the second group to a power system.

14-12. The power management method according to any one of 14 to 14-11, wherein the storage battery control step includes further controlling a private power generation apparatus configured to supply power to the storage battery of the second group, and feeding power generated by the private power generation apparatus to the power system.

15. A program for causing a computer to function as:
an event information acquisition unit that acquires event information indicating an occurrence of a predetermined event relating to a natural disaster and a detail of the event;
a grouping unit that divides a plurality of storage batteries as managing targets into a first group and a second group, on the basis of the event information; and
a storage battery control unit that controls a charging operation of each storage battery for each of the groups.

15-2. The program according to 15, causing the grouping unit to function as
a user interface unit that outputs effect information indicating an effect of the event on each of the plurality of storage batteries, the effect information created on the basis of the event information, and that receives a user's input for grouping the storage batteries into the first group and the second group, and
a first grouping unit that divides the storage batteries into the first group and the second group on the basis of the user's input.

15-3. The program according to 15-2, causing the user interface unit to output an installation position of each of the storage batteries and a damage prediction area which is predicted to suffer damage of a predetermined level on the basis of the event information, as the effect information.

15-4. The program according to 15-3, causing the user interface unit to function as
a unit that displays a map of an area installed with a storage battery, on a display,
a unit that superimposes and displays information indicating the installation position of each storage battery, on the map, and
a unit that superimposes and displays information indicating the damage prediction area, on the map.

15-5. The program according to any one of 15-2 to 15-4, causing the user interface unit to function as a unit that outputs at least one of an amount of charge, an accumulative number of years in use, and a capacity of each of the storage batteries.

15-6. The program according to 15, causing the grouping unit to function as a second grouping unit that specifies a damage prediction area on the basis of the event information acquired by the event information acquisition unit and damage prediction information in which the damage prediction area is specified in advance for each of details of the event, and classifies the storage battery located in the damage prediction area as the second group on the basis of storage battery information indicating an installation position of each of the storage batteries.

15-7. The program according to 15-6, causing the second grouping unit to classify a storage battery as the second group even in a case of the storage battery being classified as the first group on the basis of the damage prediction area, when the storage battery is determined to satisfy a predetermined condition on the basis of the storage battery information including at least one of the amount of charge, the accumulative number of years in use and, the capacity of each of the storage batteries.

15-8. The program according to 15-6 or 15-7, causing the second grouping unit to classify a storage battery as the first group even in a case of the storage battery being classified as the second group on the basis of the damage prediction area, when the storage battery is determined to satisfy a predetermined condition on the basis of the storage battery information including at least one of the accumulative number of years in use and the capacity of each of the storage batteries.

15-9. The program according to 15, causing the grouping unit to function as a second grouping unit that divides the plurality of storage batteries into the first group and the second group, on the basis of the event information acquired by the event information acquisition unit and storage battery information relating to each of the storage batteries.

15-10. The program according to any one of 15 to 15-9, causing the storage battery control unit to perform control so as to discharge power of the storage battery of the second group.

15-11. The program according to 15-10, causing the storage battery control unit to perform control so as to feed the power of the storage battery of the second group to a power system.

15-12. The program according to any one of 15 to 15-11, causing the storage battery control unit to further control a private power generation apparatus configured to supply power to the storage battery of the second group, and feed power generated by the private power generation apparatus to the power system.

16. A power management apparatus including:
an event information acquisition unit that acquires event information indicating an occurrence of a predetermined event relating to a natural disaster and a detail of the event; and
a grouping unit that divides a plurality of storage batteries as managing targets into a first group and a second group, on the basis of the event information, wherein the grouping unit includes:
a user interface unit that outputs effect information indicating an effect of the event on each of the plurality of storage batteries, the effect information created on the basis of the event information, and that receives a user's input for grouping the storage batteries into the first group and the second group, and
a first grouping unit that divides the storage batteries into the first group and the second group on the basis of the user's input.

17. The power management apparatus according to 16, wherein the user interface unit outputs information indicating a damage area which is predicted to suffer damage of a predetermined level on the basis of an installation position of each of the storage batteries and the event information.

18. The power management apparatus according to 17, wherein the user interface unit includes:
a unit that displays a map of an area installed with a storage battery, on a display,
a unit that superimposes and displays information indicating the installation position of each storage battery, on the map, and
a unit that superimposes and displays information indicating the damage area, on the map.

19. A power management method executed by a computer, the method including:
an event information acquisition step of acquiring event information indicating an occurrence of a predetermined event relating to a natural disaster and a detail of the event; and
a grouping step of dividing a plurality of storage batteries as managing targets into a first group and a second group, on the basis of the event information, wherein the grouping step executed by the computer includes:
a user interface step of outputting effect information indicating an effect of the event on each of the plurality of storage batteries, the effect information created on the basis of the event information, and receiving a user's input for grouping the storage batteries into the first group and the second group, and
a first grouping step of dividing the storage batteries into the first group and the second group on the basis of the user's input.

19-2. The power management method according to 19, wherein the user interface step includes outputting information indicating a damage area which is predicted to suffer damage of a predetermined level on the basis of an installation position of each of the storage batteries and the event information.

19-3. The power management method according to 19-2, wherein the user interface step executed by the computer includes
a step of displaying a map of an area installed with a storage battery, on a display,
a step of superimposing and displaying information indicating the installation position of each storage battery, on the map, and
a step of superimposing and displaying information indicating the damage area, on the map.

20. A program for causing a computer to function as:
an event information acquisition unit that acquires event information indicating an occurrence of a predetermined event relating to a natural disaster and a detail of the event; and
a grouping unit that divides a plurality of storage batteries as managing targets into a first group and a second group, on the basis of the event information, wherein the grouping unit is caused to function as:
a user interface unit that outputs effect information indicating an effect of the event on each of the plurality of storage batteries, the effect information created on the basis of the event information, and that receives a user's input for grouping the storage batteries into the first group and the second group, and
a first grouping unit that divides the storage batteries into the first group and the second group on the basis of the user's input.

20-2. The program according to 20, causing the user interface unit to output information indicating a damage area which is predicted to suffer damage of a predetermined level on the basis of an installation position of each of the storage batteries and the event information.

20-3. The program according to 20-2, causing the user interface unit to function as
a unit that displays a map of an area installed with a storage battery, on a display,
a unit that superimposes and displays information indicating the installation position of each storage battery, on the map, and
a unit that superimposes and displays information indicating the damage area, on the map.

This application claims priority from Japanese Patent Application No. 2014-200604 filed on Sep. 30, 2014, the content of which is incorporated herein by reference in its entirety.

The invention claimed is:
1. A power management apparatus comprising:
an event information acquisition unit that acquires event information indicating an occurrence of a predetermined event relating to a natural disaster and a detail of the event;
a grouping unit that divides a plurality of storage batteries as managing targets into a first group and a second group, on the basis of the event information, wherein the grouping unit includes:
a user interface unit that
outputs effect information indicating an effect of the event on each of the plurality of storage batteries, the effect information created on the basis of the event information, wherein the effect information includes an installation position of each of the storage batteries and a damage prediction area which is predicted to suffer damage of a predetermined level and
receives a user's input for grouping the storage batteries into the first group and the second group, and
a first grouping unit that divides the storage batteries into the first group and the second group on the basis of the user's input; and
a storage battery control unit that controls a charging operation of each storage battery for each of the groups.

2. The power management apparatus according to claim 1, wherein the user interface unit includes:
a unit that displays a map of an area installed with a storage battery, on a display, a unit that superimposes and displays information indicating the installation position of each storage battery, on the map, and a unit that superimposes and displays information indicating the damage prediction area, on the map.

3. The power management apparatus according to claim 1, wherein the user interface unit includes a unit that outputs at least one of an amount of charge, an accumulative number of years in use, and a capacity of each of the storage batteries.

4. The power management apparatus according to claim 1, wherein the grouping unit includes a second grouping unit that specifies a damage prediction area on the basis of the event information acquired by the event information acquisition unit and damage prediction information in which the damage prediction area is specified in advance for each of details of the event, and classifies the storage battery located in the damage prediction area as the second group on the basis of storage battery information indicating an installation position of each of the storage batteries.

5. The power management apparatus according to claim 4, wherein the second grouping unit classifies a storage battery as the second group even in a case of the storage battery being classified as the first group on the basis of the damage prediction area, when the storage battery is determined to satisfy a predetermined condition on the basis of the storage battery information including at least one of the amount of charge, the accumulative number of years in use and, the capacity of each of the storage batteries.

6. The power management apparatus according to claim 4, wherein the second grouping unit classifies a storage battery as the first group even in a case of the storage battery being classified as the second group on the basis of the damage prediction area, when the storage battery is determined to satisfy a predetermined condition on the basis of the storage battery information including at least one of the accumulative number of years in use and the capacity of each of the storage batteries.

7. The power management apparatus according to claim 1, wherein the grouping unit includes a second grouping unit that divides the plurality of storage batteries into the first group and the second group, on the basis of the event information acquired by the event information acquisition unit and storage battery information relating to each of the storage batteries.

8. The power management apparatus according to claim 1, wherein the storage battery control unit performs control so as to discharge power of the storage battery of the second group.

9. The power management apparatus according to claim 8, wherein the storage battery control unit performs control so as to feed the power of the storage battery of the second group to a power system.

10. The power management apparatus according to claim 1, wherein the storage battery control unit further controls a private power generation apparatus configured to supply power to the storage battery of the second group, and feeds power generated by the private power generation apparatus to the power system.

11. A power management system comprising:
the power management apparatus according to claim 1; and
a plurality of storage batteries.

12. A power management method executed by a computer, the method comprising:
an event information acquisition step of acquiring event information indicating an occurrence of a predetermined event relating to a natural disaster and a detail of the event;
a grouping step of dividing a plurality of storage batteries as managing targets into a first group and a second group, on the basis of the event information, wherein the grouping step executed by the computer includes:
a user interface step of
outputting effect information indicating an effect of the event on each of the plurality of storage batteries, the effect information created on the basis of the event information, wherein the effect information includes an installation position of each of the storage batteries and a damage prediction area which is predicted to suffer damage of a predetermined level and
receiving a user's input for grouping the storage batteries into the first group and the second group, and
a first grouping step of dividing the storage batteries into the first group and the second group on the basis of the user's input; and
a storage battery control step of controlling a charging operation of each storage battery for each of the groups.

13. A non-transitory storage medium storing a program for causing a computer to function as:
an event information acquisition unit that acquires event information indicating an occurrence of a predetermined event relating to a natural disaster and a detail of the event;
a grouping unit that divides a plurality of storage batteries as managing targets into a first group and a second group, on the basis of the event information, wherein the grouping unit includes:
a user interface unit that
outputs effect information indicating an effect of the event on each of the plurality of storage batteries, the effect information created on the basis of the event information, wherein the effect information includes an installation position of each of the storage batteries and a damage prediction area which is predicted to suffer damage of a predetermined level and
receives a user's input for grouping the storage batteries into the first group and the second group, and
a first grouping unit that divides the storage batteries into the first group and the second group on the basis of the user's input; and
a storage battery control unit that controls a charging operation of each storage battery for each of the groups.

* * * * *